Figure 9:
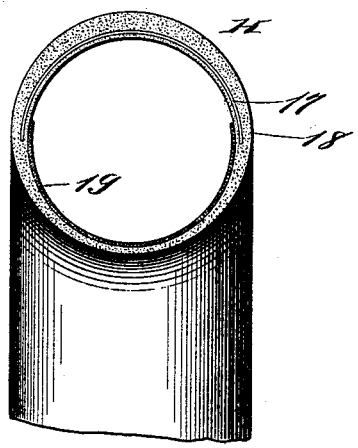

(No Model.) 4 Sheets—Sheet 1.
R. W. HUSS.
PNEUMATIC TIRE.
No. 495,975. Patented Apr. 25, 1893.
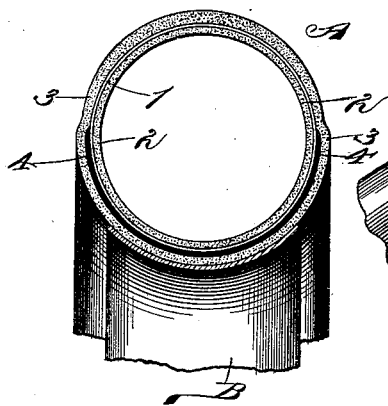
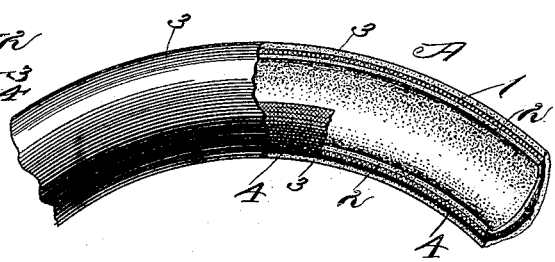
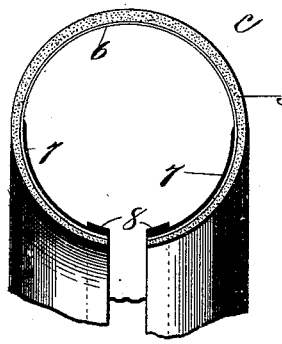
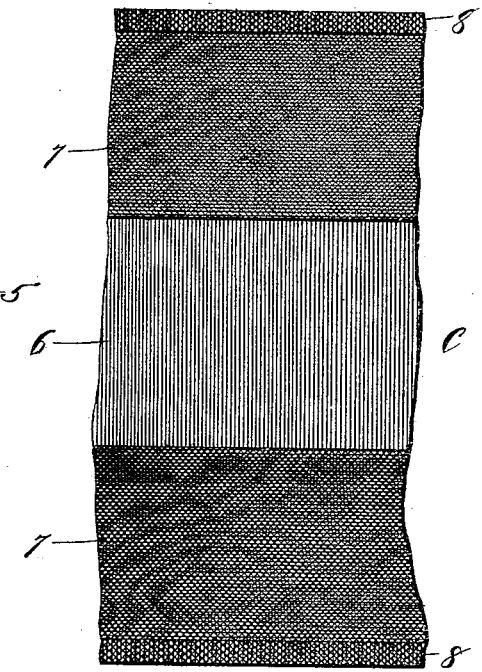
Witnesses
Inventor
Rudolph W. Huss
By Chas. G. Page
Atty.

(No Model.) 4 Sheets—Sheet 2.
R. W. HUSS.
PNEUMATIC TIRE.
No. 495,975. Patented Apr. 25, 1893.
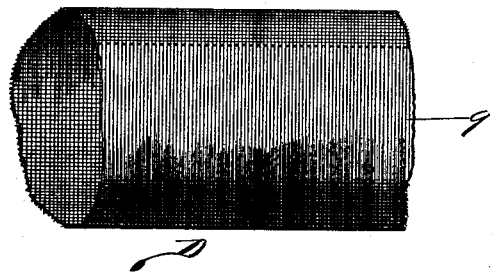
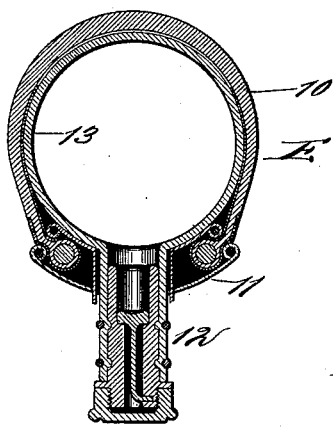
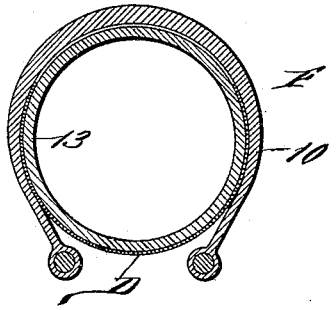
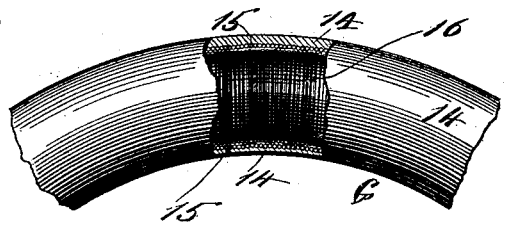
Witnesses
Inventor
Rudolph W. Huss
By Chas. G. Page
Atty.

(No Model.) 4 Sheets—Sheet 3.

R. W. HUSS.
PNEUMATIC TIRE.

No. 495,975. Patented Apr. 25, 1893.

Witnesses
W. D. Middleton
Reta M. Wagner

Inventor
Rudolph W. Huss
By Chas. G. Page
Atty (No Model.) 4 Sheets—Sheet 4.

R. W. HUSS.
PNEUMATIC TIRE.

No. 495,975. Patented Apr. 25, 1893.

Witnesses
W. D. Middleton
Rita M. Wagner

Inventor
Rudolph W. Huss
By Chas. G. Page
Atty.

THE NORRIS PETERS CO., PHOTO-LITHO., WASHINGTON, D. C.

UNITED STATES PATENT OFFICE.

RUDOLPH W. HUSS, OF CHICAGO, ILLINOIS, ASSIGNOR TO HENRY A. LOZIER, TRUSTEE FOR THE CLEVELAND TIRE COMPANY, OF CLEVELAND, OHIO.

PNEUMATIC TIRE.

SPECIFICATION forming part of Letters Patent No. 495,975, dated April 25, 1893.

Application filed October 11, 1892. Serial No. 448,532. (No model.)

*To all whom it may concern:*

Be it known that I, RUDOLPH W. HUSS, a citizen of the United States, residing at Chicago, in the county of Cook and State of Illinois, have invented a certain new and useful Improvement in Pneumatic Tires, of which the following is a specification.

My invention relates to pneumatic tires for velocipedes and other vehicles, and has for its more prominent objects, to provide a durable, highly resilient, easy riding high speed and generally efficient tire; to avoid vibrations incident to the act of running over obstructions; and to avoid prolonged indentations or depressions in the tire while passing over such obstructions, and at the same time to adapt the tire to yield at the point of immediate contact with an obstruction so that it will pass over the same with ease and without inducing an undesirable jar or vibration on the part of the machine.

In a tire characterized by my invention, its tread or tread portion is reinforced or supplemented by a layer or layers of threads or thread portions arranged transversely with relation to the tread and applied or incorporated within the tire in any desired or suitable way consistent with or appropriate to the construction of tire employed. This arrangement of threads or thread portions serves to provide an easy riding, durable and highly efficient construction of tire, having a highly resilient tread which in passing over obstructions along the road, will yield to the same in a way to avoid undue prolongation of the depressions which are necessarily caused in the tire by the obstructions it may thus encounter. The layer of threads or thread portions forms a reinforcing layer, and since the arrangement of thread is transverse with relation to the tread portion of the tire, the same will be reinforced against lateral expansion, but at the same time all desired longitudinal elasticity on the part of the tread portion of the tire will be permitted, no matter how closely the portions of the thread or threads employed may lie together. While the tire thus reinforced will have a marked degree of life or resilient action at each and every point along its tread and will yield inwardly to an obstruction which it may encounter to a surprising extent, the elastic yield will be notably confined to the point of immediate depression induced by the act of running the tire over the obstruction. The layer of transversely arranged thread or thread portions also serves to resist punctures. Thus, for example, should a nail or the like penetrate the outer layer or cover of the tire, its farther penetration will be resisted by such thread or threads as it may encounter.

In providing a tire-tread with a layer or layers of transversely arranged threads or thread portions, for the purposes aforesaid, I do not confine myself to any special construction of pneumatic tire, nor do I confine myself to any special way of securing or incorporating the thread within the structure, and I may supplement or reinforce the tread portion only of the tire by the transversely arranged threads or thread portions, or I may in addition thereto, supplement or reinforce by such means, any or all of the remaining portion or portions of the tire.

My invention also contemplates as matters of further improvement, certain details of construction and arrangement, and special modes of preparing and incorporating the reinforcing layers of thread, as hereinafter fully disclosed.

The various figures of the accompanying drawings, illustrate several of the many ways in which a layer or layers of transversely arranged threads or thread portions can be embodied in hollow or pneumatic tires in accordance with my invention, and can be best explained in conjunction with the following description of their structural features.

In Figure 1, which represents a section taken transverely through a portion of a pneumatic tire A, the tread portion of the tire is reinforced by a layer 1 of transversely arranged threads or thread portions formed by a spiral winding of thread or threads, the arrangement of which is further illustrated in Fig. 2, which shows on a smaller scale, a portion of the tire partly in elevation and partly in longitudinal central section. The thread thus arranged is interposed between a couple of rubber or like elastic tubular tire sheets or layers 2, and 3, and can be first wound upon the inner layer 2 and then covered with the outer layer or sheath 3. By such arrangement the tread portion of the tire is provided with a layer of transversely arranged threads or thread portions, adapted to characterize the same and attain the various highly advantageous results, hereinbefore set forth. The remaining portion of the tire, or so much thereof as may be desired, can however be more heavily reinforced, and to such end the tire can embody a supplemental layer 4, of cloth, canvas, or other analogous or suitable reinforcing material, it being observed that by omitting this supplemental reinforcement along the tread, the latter is left in full possession of the properties hereinbefore mentioned. The tire in Fig. 1 is shown seated upon a wheel-rim B, which latter can be of any desired construction.

Fig. 3 represents a section taken transversely through a tire sheath C which is open along its seating portion, and Fig. 4 shows a portion of such sheath, spread out so as to illustrate its inner side. In this construction, the outer tire layer 5 of rubber or analogous elastic material, has its tread portion provided with an inner lining 6 of transversely arranged threads or thread portions. The thread layer can be formed by spirally winding the thread or threads about a mandrel and then applying the tire layer 5, and in addition thereto, I can either apply a layer of canvas or the like as in Fig. 1 or arrange the same within the layer of thread as in Fig. 3 in which the longitudinal division of the seating portion of the tire will subdivide such layer into the two side strips or layers 7. Obviously therefore, the arrangement of a supplemental reinforcing layer of canvas or the like in Fig. 1 can be employed in Fig. 3, or conversely the arrangement in Fig. 3 can be employed in Fig. 1. The threads or thread portions which thus reinforce the tread portion of the tire can be embedded in the rubber tire layer 5, or they can simply lie against the inner side thereof, and in such case, the remaining portions of the threads can be embedded or united with the remaining portions of such tire layer, and can also in like manner unite with the supplemental layers 7 through the intervention of suitable strata of rubber or cement, adapted for such purpose. The tire of Figs. 1 and 2 can be formed upon any suitable mandrel, either circular or otherwise, and the winding can be accomplished by any suitable winding device, and in like way, the sheath of Figs. 4 and 3 can be formed upon a mandrel and then split, or if desired it can be formed with a gap or split at the start, it being obvious however, that it can be economically formed entirely about the mandrel, and then divided. The sheath of Figs. 1 and 4 is also shown reinforced along its longitudinal edges as at 8 for purposes which will be readily understood by those familiar with pneumatic tires.

Fig. 5 represents a tube D of woven fabric having the warp threads omitted along a portion of its circumferential width so as to provide transversely arranged threads or thread portions 9 for reinforcing the tread portion of a tire. The fabric thus formed can be incorporated within a tire, either in tubular form, or it can be split longitudinally and then incorporated within the tire. In Fig. 6 I have shown a section taken transversely through a pneumatic tire E, having its sheath or outer layer 10 reinforced by fabric woven as in Fig. 5 but divided longitudinally in correspondence with the formation of the sheath. In said Fig. 6 I have shown one of a multitude of ways in which the sheath can be held upon a wheel rim 11, and have also taken the section through a valved nipple 12 for an inclosed air-tube 13.

Fig. 7 shows a section taken transversely through a tire F with the reinforcing layer formed by a tube D such as shown in Fig. 5. The reinforcing fabric having its warp threads omitted along the tread portion of the tire can be united in whole or in part to any one or more of the tire layers employed, either in whole or in part, or it can be simply arranged as a pocket between an air tube 13 and sheath 10, and if desired, the layer of fabric can be duplicated or multiplied, and united in whole or in part to either the air tube or inflatable tubular layer or to the sheath, or both as may be desired. While this fabric constitutes a matter of special improvement which I have embodied and claimed in another application for Letters Patent of the United States, it will be observed that like the layer formed by a spiral winding with no warp threads whatsoever, it involves the feature of a tire having its tread portion reinforced by transversely arranged threads. Also, that I could supplement the spiral winding by a layer or layers of warp or longitudinally arranged threads, incorporated in any desired way in the tire, but omitted along the tread portion thereof, although this supplemental reinforcement along the seating portion or opposite sides of the tire is more conveniently attained either by providing a supplemental layer or layers of canvas or the like, or by using stouter material as in Figs. 6 and 7, in which it will be seen that while the tread portion of the tire is reinforced by transversely arranged threads or thread portions, the remaining portion of the tire is more heavily reinforced by reason of the warp or longitudinal threads in conjunction with the woof or transverse threads.

Fig. 8 represents partly in elevation and partly in longitudinal central section, a portion of a tire G having its tread portion reinforced by a couple of layers 15 and 16 of transversely arranged threads or thread portions, whereof the layer 15 is arranged to line the elastic sheath 14, while the layer 16 is understood to be applied directly to and about an inclosed air-tube.

Figure 10:
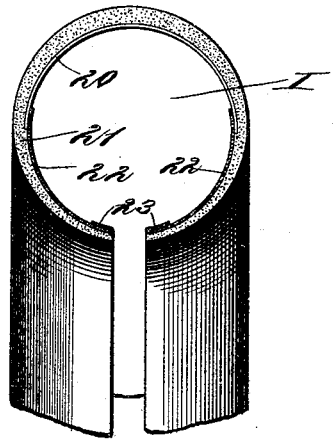

In Fig. 9 I have shown a section taken transversely through a tire H having its tread portion reinforced by a layer 17 formed by transversely arranged threads or thread portions and made so as to extend only partially along the circumferential width of the tire. The thread is shown embedded within an elastic layer 18 which can be readily built up by suitable layers or strata of rubber, upon a mandrel, and in this connection I have shown the seating portion of the tire reinforced by a supplemental strip or layer 19 arranged to line the same. The thread or threads can be carried back and forth in directions transverse to the line of tread, in any suitable way, and if desired could be arranged to lie free from the tire layer 18 along any desired width of the tread as hereinafter explained in connection with Fig. 11. The tire or tire tube H can obviously be used both as an inflatable tube and sheath combined, or it can be divided longitudinally or otherwise adapted as a sheath for an air tube, as further illustrated in Fig. 10 in which the sheath or casing I can involve the construction of Fig. 9, or it may as a slight variation therefrom, have the thread layer 20 composed of transversely arranged threads or thread portions, applied against the inner side of the tread portion of the tube sheet or layer 21, and also have the layers of canvas 22 folded over along their edge portions at 23, either with or without additional reinforcements along such points.

Figure 11:
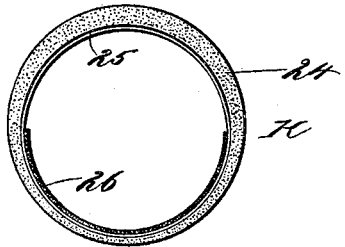

Fig. 11 represents a cross section through a portion of a tire tube K which can be split or otherwise adapted as a sheath for an air-tube, or employed as an air-tube as may be desired. In this illustration, the elastic tread portion of the tube or sheath 24 is reinforced by a layer 25 of transversely arranged threads or thread portions which simply lie against the inner side or wall of such tread portion of the tube or sheath, but which are united with or embedded in the remaining portions of the tubular sheath or layer, and in addition thereto, I can provide a supplemental layer 26 of cloth, canvas or the like, which is absent along the tread portion of the tire.

Figure 12:
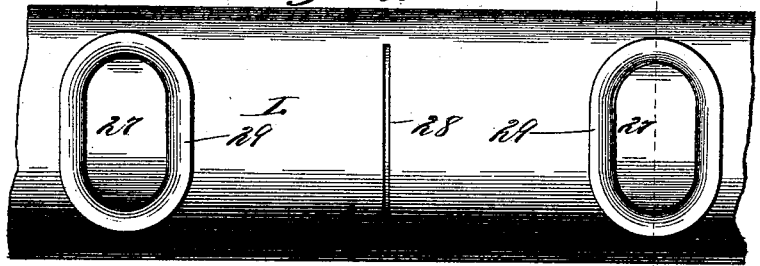

From the foregoing it will be seen that my invention can be applied to tires of the type illustrated in Fig. 1, and various succeeding figures, and that it is equally applicable to tires of the type illustrated in Fig. 6 and certain other figures herein involved. Also that it can be applied to all other known or desired constructions of hollow or pneumatic tires, and that it would be needless to multiply illustrations of the same. I have however, as a further example shown in Fig. 12 a portion of a tubular tire sheath L which can inclose an air tube, and which can be provided with transverse openings 27 or transverse slits 28 through which access can be had to the interior of the sheath for the purpose of mending the air tube in case of rupture. The slits or openings can be temporarily covered by patches, but such are not absolutely necessary, and where the slits are employed, the patches can well be dispensed with.

Figure 13:
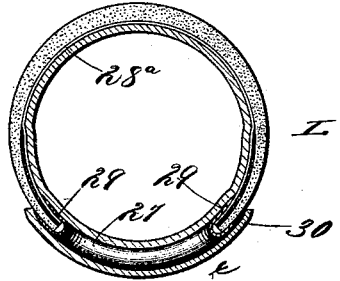

When the air-tube is uninflated, it can be so drawn through one of the slits or openings as to permit it to be patched at any point of rupture, and when replaced and inflated, its patch will be clamped between the air tube and sheath and thereby held firmly in place. So far as I am aware, this feature is novel with me, and obviously the sheath L can be reinforced along its tread portion by a layer or layers of transversely arranged threads or thread portions, as described in connection with preceding figures, one arrangement of such feature being shown in Fig. 13 which represents a section through Fig. 12 on line $x-x$. In this figure the sheath L is reinforced by the thread layer $28^a$ and provided with a binding 29 along its opening 27, which latter is temporarily covered by a patch 30.

Figure 14:
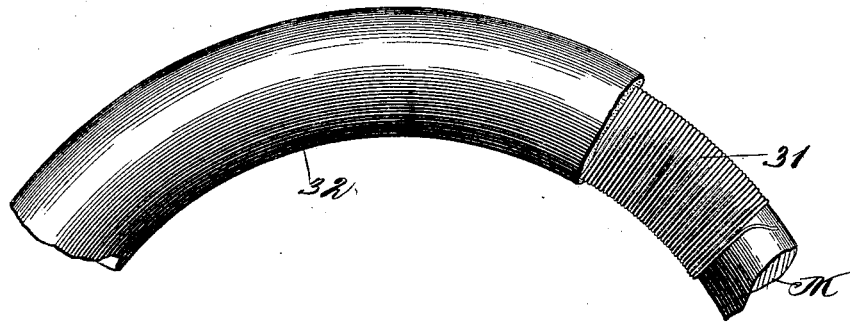

As illustrative of a simple, convenient and economical mode of lining the tread portion of a tire layer with a layer of transversely arranged threads or thread portions, I have shown in Fig. 14 a portion of a mandrel M upon which the tire sheet or tubular structure can be formed. The thread can be wound directly upon this mandrel so as to form a layer 31, and the layer 32 of rubber can be applied upon such thread layer and be caused by suitably applied pressure to unite either with the entire layer of thread, or to unite with the same along the sides and seating portion of the structure so that while the thread will be embedded therein, it will simply lie again against the inner side of the tread portion of the tube or tire sheet. This tubular sheet can be vulcanized, and then split to form a sheath, or otherwise used as will be understood by referring back to the description of preceding figures. As a special matter of improvement however the layer of rubber is pressed upon the layer of thread as aforesaid so as to incorporate or embed the thread within the rubber, and by such arrangement, a sheath such as illustrated in Fig. 4 can be produced, it being seen that to produce a sheet such as in said figure, the canvas strips 7 can be first laid upon the mandrel and the thread then wound spirally about the whole. The pitch of the winding may be obviously varied, since in all cases it will reinforce the tread by transverse or cross threads or thread portions which cross the line of tread, and which unite with or lie against the tube sheet, as hereinbefore stated. The arrangement in said Fig. 4 involves in common with various other arrangements herein set forth and illustrated, the feature of a tire which is adapted to have a longitudinal elastic yield or stretch along its tread as a result of leaving the cross threads which reinforce such portion of the tire, free to separate from one another, and as a result of such elastic yield or stretch, the tire has a notable degree of life or activity and will run over obstructions easily without undesirable vibration. Where the cross threads are not embedded in the elastic tread, both of such portions of the tire are free to stretch longitudinally, while at the same time the cross threads will hold the air tube against undue expansion and lateral stretch. Where the cross threads are embedded in the elastic tube sheet or sheath, they are still separable or free to separate from one another since they are simply connected together by an elastic connection which will stretch or yield longitudinally, but which will be held against transverse stretch by the threads which will not stretch. Hence, although the threads may separate from one another at any point during the passage of the tire over an obstruction, they will nevertheless be restored to their proper normal position by the retraction of the elastic connection, as soon as the obstruction has been passed. It will be seen therefore that my invention contemplates reinforcing a tire tread by a layer of parallel threads united by elastic connection and arranged so that while allowing the tread to have a longitudinal stretch, they will hold the same against transverse stretch. A further feature involved in reinforcing the sides of the tire by strips, or by both warp and woof threads, in conjunction with cross-threads along the tread, is that while the tire can have a longitudinal elastic stretch or yield along its tread, its sides will be held against such elastic yield or stretch, by reason of the strip or strips in one case, or the warp threads of a fabric in the other.

Figure 15:
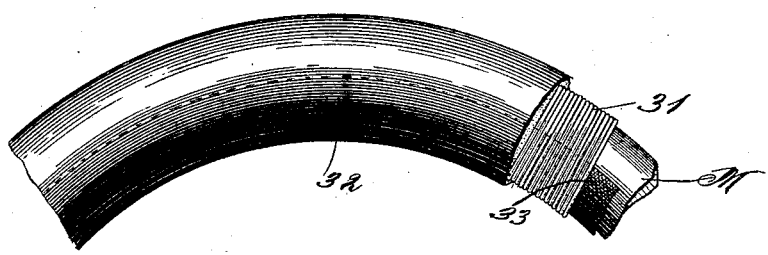

The supplemental reinforcing layers of canvas or like material hereinbefore described can also be applied during the process of thus constructing and reinforcing a tire. Thus, for example, the layer 33 of canvas can be placed next to the mandrel M as in Fig. 15, and the thread then wound so as to form the layer 31, or the layer 33 can be arranged so as to intervene between the thread layer 31 and the tire layer 32. The thread can be economically applied by winding, but I may apply it in any other desired way which will serve to attain the results hereinbefore set forth, it being for example, apparent that the thread layers of Figs. 9 and 10 can be arranged upon a mandrel preparatory to or during the act of preparing the tire or tire sheet, and that the remaining layer or layers of the tire can be applied in any desired way.

Either the sides or seating portion or both, of the tire can be variously constructed or reinforced, so long as the distinctive feature of the tread portion reinforced by a layer of transversely arranged threads or thread portions formed from the woof threads of a fabric or from a spiral winding of thread or threads, or from thread applied in any other suitable way, is preserved. The layer of thread or threads can be duplicated or multiplied, and the thread can be of any desired size and material, it being observed that by the term thread, I include cord or twine which are simply different sizes of thread, and that in practice, stout linen thread or twine will be found highly advantageous, although I do not confine myself to thread of any particular material. Where a portion of the tire is more heavily reinforced or supplemented by a layer or layers of cloth, canvas, or like reinforcing material, the same can if desired and consistent with the arrangement of thread, be cemented to or united with the thread by stitching, or the like, it being apparent however that a layer of rubber will form an economical and desirable means for uniting the two.

Where the tire comprises a sheath and inclosed inflatable tube, both of such members can be reinforced by threads arranged as hereinbefore set forth, or a layer of thread can be arranged to intervene between the two, it being understood that in both cases, the tread portion of the tire is reinforced by a layer or layers of transversely arranged threads or thread portions.

Figure 16:
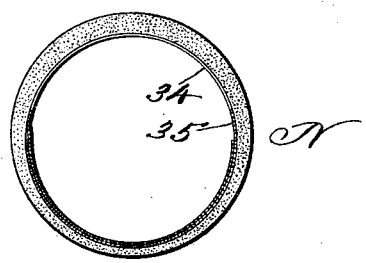

In Fig. 16 which shows a section taken transversely through a portion of a tire, N, the tread is understood to be reinforced by a layer 34 of transverse threads formed by a woven fabric having the warp threads omitted along the tread. This fabric is woven of such width that its combined warp and woof portions 35 can when incorporated within the tire, overlap as shown, and thereby provide the sides and seating portions of the tire with additional reinforcing material, and obviously the tube thus formed could be split along the tread if so desired.

What I claim as my invention is—

1. A hollow pneumatic tire reinforced by a layer or layers of transversely arranged threads or thread portions incorporated within the tire for the purpose set forth.

2. A hollow or pneumatic tire having its tread portion reinforced by a layer of transversely arranged threads or thread portions.

3. A pneumatic tire comprising a sheath or tube sheet lined by a layer of thread or threads applied to reinforce the tread portion of the tire by transversely arranged threads or thread portions, substantially as set forth.

4. A pneumatic tire having a layer of threads or thread portions united with an elastic tube sheet or layer of the tire and applied to reinforce the tread portion of the tire by transversely arranged threads or thread portions, substantially as described.

5. A pneumatic tire having its tread portion reinforced by a layer of transversely arranged threads or thread portions said layer being disunited from the tread portion of the tire substantially as set forth.

6. A pneumatic tire having its tread portion reinforced by a layer of threads or thread portions formed from a spiral winding of thread or threads, substantially as set forth.

7. A pneumatic tire having its tread portion reinforced by a layer of transversely arranged threads or thread portions and having its remaining portion more heavily reinforced, substantially as described.

8. A pneumatic tire having its tread portion reinforced by a layer of transversely arranged threads or thread portions and having its remaining portion reinforced by a supplemental strip or strips of reinforcing material, substantially as set forth.

9. A pneumatic tire having its tread-portion reinforced by a layer of transversely arranged threads or thread portions formed from a spiral winding of thread or threads, and having its remaining portion provided with a supplemental or heavier reinforcement, substantially as set forth.

10. A pneumatic tire having its tread portion reinforced by a layer of transversely arranged threads or thread portions formed from a spiral winding of thread or threads, and having its remaining portion provided with a supplemental reinforcing layer or layers, substantially as set forth.

11. A pneumatic tire comprising a sheath which is open along the seating portion of the tire, and an inclosed air tube, and a reinforcement for the tread portion of the tire consisting of a layer of transversely arranged threads or thread portions, substantially as set forth.

12. A pneumatic tire comprising a sheath, and an inclosed inflatable air tube which is provided with a reinforcing layer of transversely arranged threads or thread portions applied for reinforcing the tread portion of the tire, substantially as set forth.

13. A pneumatic tire reinforced along its tread portion by transversely arranged threads or thread portions and to such end having a layer of said threads or thread portions applied to line its sheath, and a like layer applied to an inclosed inflatable tube, substantially as set forth.

14. A pneumatic tire having a layer of transversely arranged thread interposed between the sheath or casing and an inner inflatable tube or tubular layer, substantially as described.

15. A pneumatic tire having an elastic tread reinforced by threads or thread portions arranged to run across the line of tread and separable from one another to permit the tread to have an elastic yield or stretch, substantially as described.

16. A pneumatic tire having its tread reinforced by cross threads or thread portions united by elastic connection and separable from one another to the extent of the elastic yield or stretch of such elastic connection longitudinally with relation to the line of tread, substantially as described.

17. A pneumatic tire having its tread reinforced by cross-threads or thread portions which are separable from one another to permit the tread to have an elastic longitudinal yield or stretch, and having its sides reinforced against longitudinal stretch, substantially as described.

RUDOLPH W. HUSS.

Witnesses:
WM. A. SKINKLE,
W. D. MIDDLETON.